(12) United States Patent
Chen et al.

(10) Patent No.: US 12,227,976 B2
(45) Date of Patent: Feb. 18, 2025

(54) LOCKING MECHANISM AND ELECTRONIC DEVICE

(71) Applicant: Delta Electronics, Inc., Taoyuan (TW)

(72) Inventors: Ting-Shou Chen, Taoyuan (TW); Hung-Chuan Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 255 days.

(21) Appl. No.: 17/746,723

(22) Filed: May 17, 2022

(65) Prior Publication Data
US 2023/0220709 A1    Jul. 13, 2023

(30) Foreign Application Priority Data

Jan. 12, 2022  (CN) .......................... 202210030465.6

(51) Int. Cl.
 *E05C 19/14* (2006.01)
 *E05B 15/00* (2006.01)
 *G06F 1/16* (2006.01)

(52) U.S. Cl.
 CPC .......... *E05C 19/145* (2013.01); *G06F 1/1656* (2013.01); *E05B 15/0086* (2013.01); *E05C 19/14* (2013.01)

(58) Field of Classification Search
 CPC .... E05C 19/14; E05C 19/145; E05B 15/0086; E05B 17/0062; E05B 65/1026;
(Continued)

(56) References Cited

U.S. PATENT DOCUMENTS

| 783,338 | A | * | 2/1905 | Ward | ....................... | E05C 19/14 |
| | | | | | | 292/68 |
| 894,495 | A | * | 7/1908 | Oscar | ...................... | E05C 19/14 |
| | | | | | | 292/247 |

(Continued)

FOREIGN PATENT DOCUMENTS

| BR | PI1001368 A2 | * | 1/2010 | ............. | E05C 19/14 |
| CN | 1900538 A | * | 1/2007 | ............... | B25B 5/12 |

(Continued)

OTHER PUBLICATIONS

An Office Action of corresponding TW application No. 111101213 issued on Aug. 24, 2022.
(Continued)

*Primary Examiner* — Christine M Mills
*Assistant Examiner* — Steven A Tullia
(74) *Attorney, Agent, or Firm* — MUNCY, GEISSLER, OLDS & LOWE, P.C.

(57) ABSTRACT

A locking device for connecting a first housing to a second housing is provided, wherein the first housing and the second housing are arranged along a first direction. The locking mechanism includes a first hook, a second hook, a movable member, and a driving member. The first hook and the second hook are affixed to the first housing, and respectively have a first engaging recess and a second engaging recess. The first engaging recess and the second engaging recess are arranged along the first direction. The movable portion has an engaging portion. The driving member is connected to the second housing and the movable member, and is configured to drive the movable member to move relative to the second housing. When the first housing is affixed to the second housing via the locking mechanism, the engaging portion is accommodated in the first engaging recess.

10 Claims, 7 Drawing Sheets

(58) Field of Classification Search
CPC . E05B 65/0817; G06F 1/1656; H05K 5/0208; H05K 5/0217; Y10T 292/0917; Y10T 292/216
See application file for complete search history.

(56) References Cited

U.S. PATENT DOCUMENTS

| | | | | |
|---|---|---|---|---|
| 960,386 | A * | 6/1910 | Obert | E05B 1/0092 292/196 |
| 1,390,105 | A * | 9/1921 | Erwin | E05C 19/14 292/247 |
| 1,437,427 | A * | 12/1922 | Langenau | E05C 19/14 292/248 |
| 1,526,216 | A * | 2/1925 | Isidor | E05C 19/14 292/247 |
| 1,796,709 | A * | 3/1931 | Halvorson | F16G 15/04 292/113 |
| 2,097,048 | A * | 10/1937 | Statler | F16G 11/12 24/270 |
| 2,564,821 | A * | 8/1951 | Smith | B60P 7/0838 81/15.8 |
| 2,635,910 | A * | 4/1953 | Celeste | E05C 19/14 292/247 |
| 2,704,218 | A * | 3/1955 | Claud-Mantle | E05C 19/14 292/113 |
| 3,338,449 | A * | 8/1967 | Swanson | E05C 19/14 292/256.69 |
| 3,847,423 | A * | 11/1974 | Gley | E05C 19/14 292/113 |
| 3,974,668 | A * | 8/1976 | McWhorter | E05B 73/0005 70/61 |
| 4,184,705 | A * | 1/1980 | Little | E05C 19/14 292/247 |
| 4,352,513 | A * | 10/1982 | Gunther | E05C 19/14 292/113 |
| 4,960,297 | A | 10/1990 | Bouse et al. | |
| 5,131,246 | A * | 7/1992 | Bonzer | E05C 19/14 292/DIG. 60 |
| 5,987,936 | A | 11/1999 | Hartman, Jr. | |
| 6,073,979 | A * | 6/2000 | Nawalaniec | B07B 1/46 292/DIG. 60 |
| 7,213,848 | B2 * | 5/2007 | Hagan | E05C 19/14 24/494 |
| 8,561,973 | B2 * | 10/2013 | Martin | E05C 19/14 269/201 |
| 2016/0053518 | A1 * | 2/2016 | Evans | E05C 19/14 292/336.3 |
| 2023/0220709 | A1 * | 7/2023 | Chen | E05C 19/145 292/113 |

FOREIGN PATENT DOCUMENTS

| | | | | |
|---|---|---|---|---|
| DE | 4042245 A1 * | 12/1990 | | E05C 19/14 |
| DE | 4118296 C2 * | 5/1995 | | H04B 1/082 |
| DE | 202011103940 U1 * | 12/2011 | | E05B 83/10 |
| DE | 102012025617 A1 * | 10/2013 | | E05C 19/14 |
| DE | 102012205203 A1 * | 10/2013 | | E05C 19/14 |
| EP | 0814223 A2 * | 6/1997 | | E05C 19/14 |
| EP | 1099629 A1 * | 5/2001 | | B64D 29/00 |
| EP | 1445543 A1 * | 8/2004 | | E05B 15/021 |
| EP | 1857352 A1 * | 11/2007 | | E05B 17/2034 |
| EP | 2208842 A2 * | 7/2010 | | E05C 19/14 |
| FR | 2681370 A1 * | 3/1993 | | E05C 19/14 |
| GB | 2064634 A * | 6/1981 | | B64D 29/06 |
| JP | S61161379 U * | 10/1986 | | E05C 19/14 |
| JP | H08144613 A | 4/1996 | | |
| JP | 08144613 A * | 6/1996 | | E05C 19/14 |
| JP | 3396687 B2 * | 4/2003 | | E05C 19/14 |
| JP | 2012045655 A * | 3/2012 | | B25H 3/023 |
| JP | 5739266 B2 | 6/2015 | | |
| KR | 101915582 B1 * | 6/2018 | | E05B 83/22 |
| TW | M500667 U | 5/2015 | | |
| WO | WO-2014166361 A1 * | 10/2014 | | E05B 83/02 |

OTHER PUBLICATIONS

Extended Search Report of its corresponding EP application No. 22175439.3 (issued on Dec. 5, 2022).

* cited by examiner

LOCKING MECHANISM AND ELECTRONIC DEVICE

CROSS REFERENCE TO RELATED APPLICATIONS

This application claims the benefit of China Patent Application No. 202210030465.6, filed Jan. 12, 2022, the entirety of which is incorporated by reference herein.

BACKGROUND OF THE INVENTION

Field of the Invention

The application relates in general to a locking mechanism, and in particular, to a locking mechanism for connecting two housings.

Description of the Related Art

With the development of technology, various electronic apparatuses and mechanical apparatuses have been widely used in industry or daily life. However, the use of some electronic apparatuses and/or mechanical apparatuses may have risks. For example, the apparatus may explode if it breaks down, and the force of impact due to the explosion may strike the housing of the container used to receive the electronic apparatuses and mechanical apparatuses, and this housing may fly away. If this shrapnel strikes a human body, it may cause physical damage, or even be life-threatening. Therefore, how to address the aforementioned problem has become an important issue.

BRIEF SUMMARY OF INVENTION

To address the deficiencies of conventional products, an embodiment of the invention provides a locking device for connecting a first housing to a second housing, wherein the first housing and the second housing are arranged along a first direction. The locking mechanism includes a first hook, a second hook, a movable member, and a driving member. The first hook and the second hook are affixed to the first housing, and respectively have a first engaging recess and a second engaging recess. The first engaging recess and the second engaging recess are arranged along the first direction. The movable portion has an engaging portion. The driving member is connected to the second housing and the movable member, and is configured to drive the movable member to move relative to the second housing. When the first housing is affixed to the second housing via the locking mechanism, the engaging portion is accommodated in the first engaging recess.

In some embodiments, in the first direction, the first engaging recess is disposed between the first housing and the second engaging recess.

In some embodiments, in a second direction that is perpendicular to the first direction, the width of the second engaging recess is greater than or equal to the width of the first engaging recess. In some embodiments, in a third direction, the length of the second engaging recess is greater than the length of the first engaging recess, wherein the third direction is perpendicular to the first direction and the second direction.

In some embodiments, in the first direction, the distance between the bottom of the second engaging recess and an end of the second hook is greater than the distance between the bottom of the first engaging recess and the bottom of the second engaging recess.

In some embodiments, a portion of the first hook is received in the second engaging recess.

In some embodiments, the first hook and the second hook are integrally formed as one piece.

In some embodiments, when the first housing is affixed to the second housing via the locking mechanism, the engaging portion is in contact with the first hook.

In some embodiments, the driving member includes an operating member, a first hinge, and a second hinge. The first hinge is pivotally connected to the movable member and the operating member, and the second hinge is pivotally connected to the second housing and the operating member. The first hinge is parallel to the second hinge. When the first housing is affixed to the second housing via the locking mechanism, the first hinge is in a first position, and the second hinge is disposed between the engaging portion and the first hinge. When the first hinge moves around the second hinge from the first position to a second position, the first hinge is disposed between the engaging portion and the second hinge.

An embodiment of the invention also provides an electronic device, including a first housing, a second housing, and the aforementioned locking mechanism.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the electronic device and the locking mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The following disclosure provides many different embodiments, or examples, for implementing different features of the subject matter provided. Specific examples of solutions and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
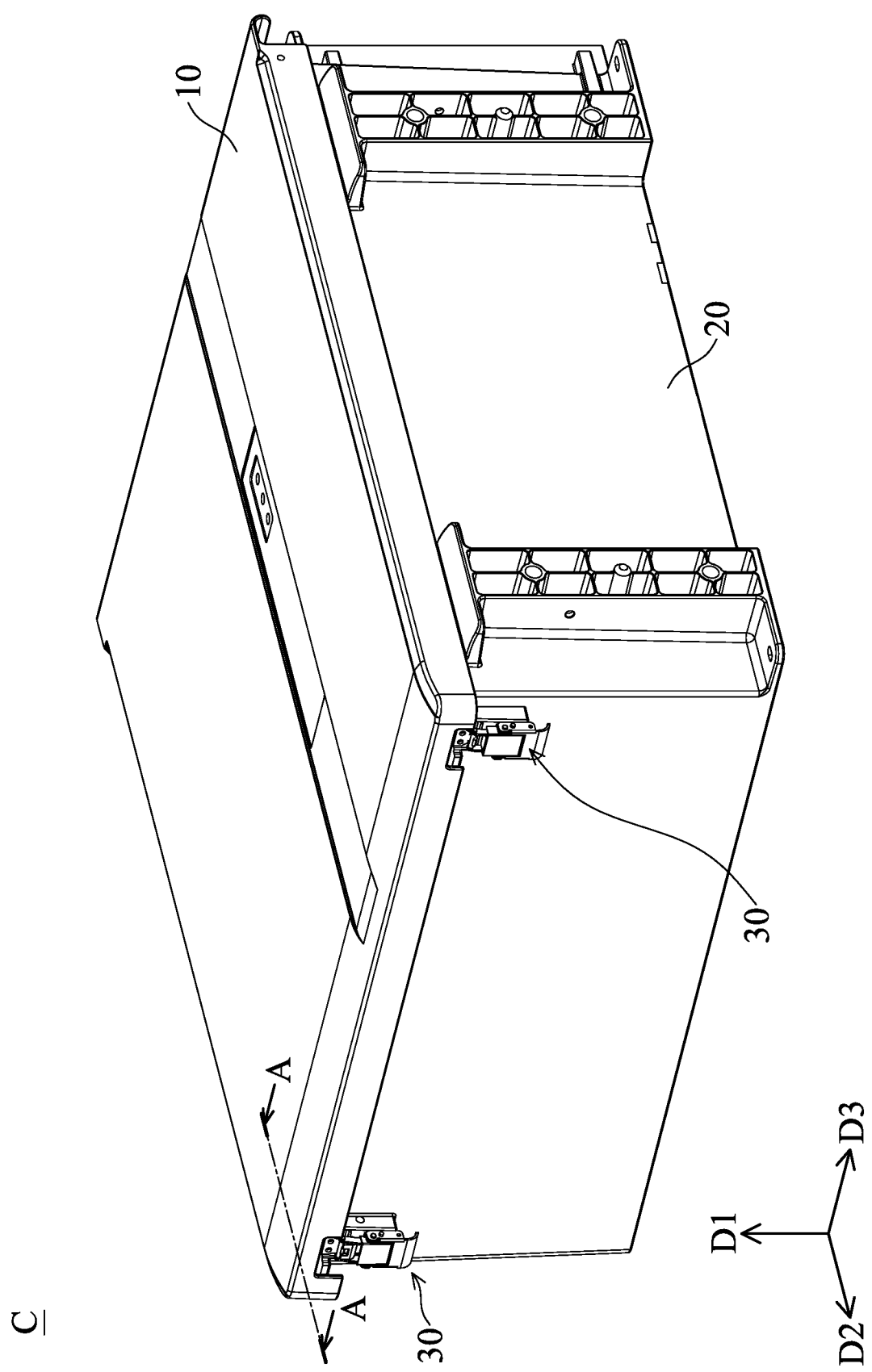
FIG. 1 is a schematic diagram of an electronic device according to an embodiment of the invention.
Figure 2:
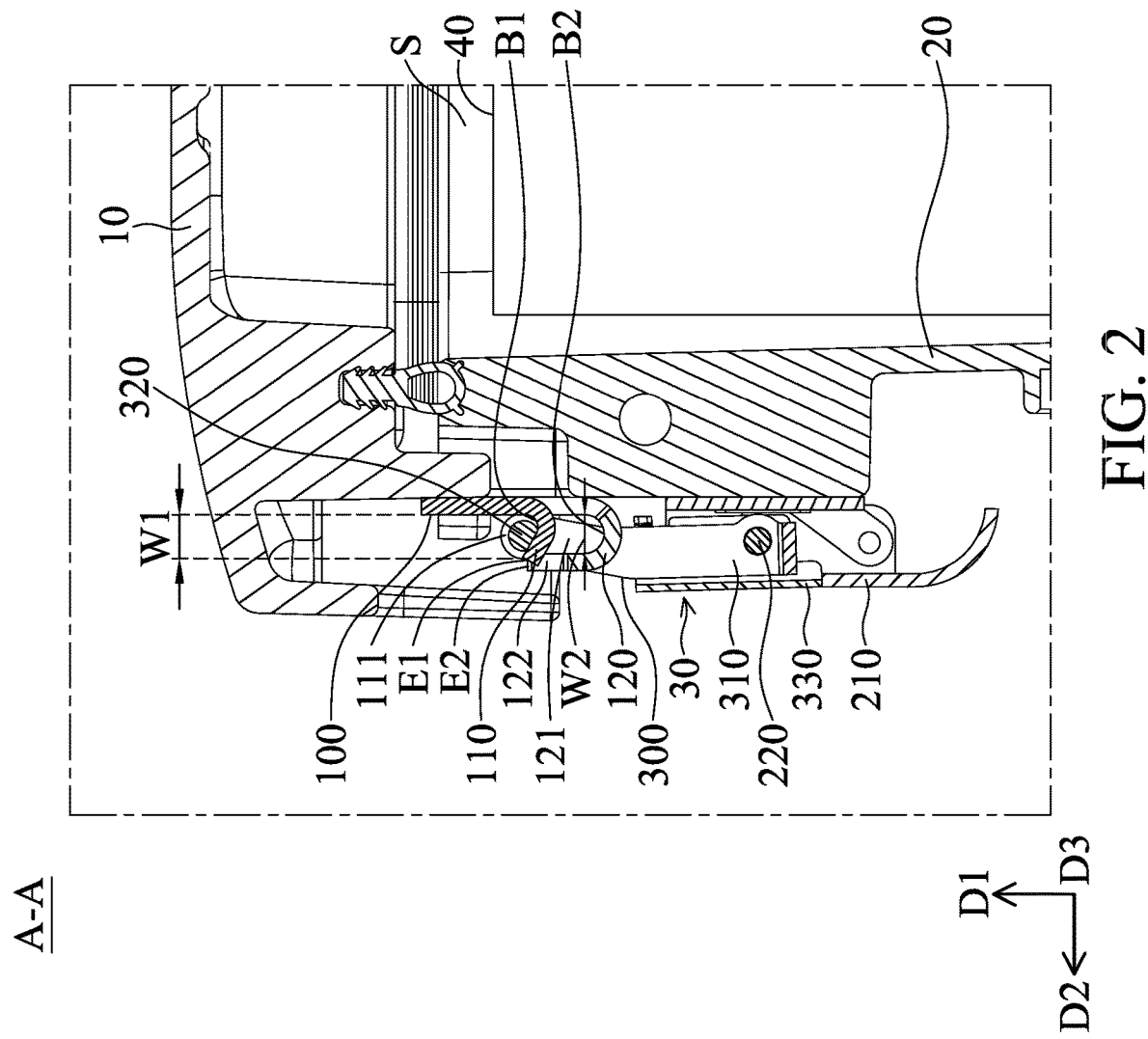
FIG. 2 is a cross-sectional view taken along the line A-A in FIG. 1.

FIG. 1 is a schematic diagram of an electronic device C according to an embodiment of the invention, and FIG. 2 is a cross-sectional view taken along the line A-A in FIG. 1. As shown in FIG. 1 and FIG. 2, the electronic device C includes a first housing 10, a second housing 20, at least one locking mechanism 30, and at least one electronic member 40, wherein the first housing 10 is detachably connected to the second housing 20, and an accommodating space S is formed between them. The electronic member 40 can be accommodated in the accommodating space S. For example, the electronic member 40 can include a battery, a transformer, a motor, an internal combustion engine, a printed circuit board, a capacitor, and/or a power component (such as an insulated gate bipolar transistor (IGBT) or a metal-oxide-semiconductor (MOS) transistor, but it is not limited thereto). When the first housing 10 and the second housing 20 are engaged with each other, they can be affixed to each other via the locking mechanism 30. The locking mechanism 30 can further prevent the first housing 10 or the second housing 20 from departing when the electronic apparatuses and mechanical apparatuses in the accommodating space have a breakdown and causes the explosion.

Figure 3:
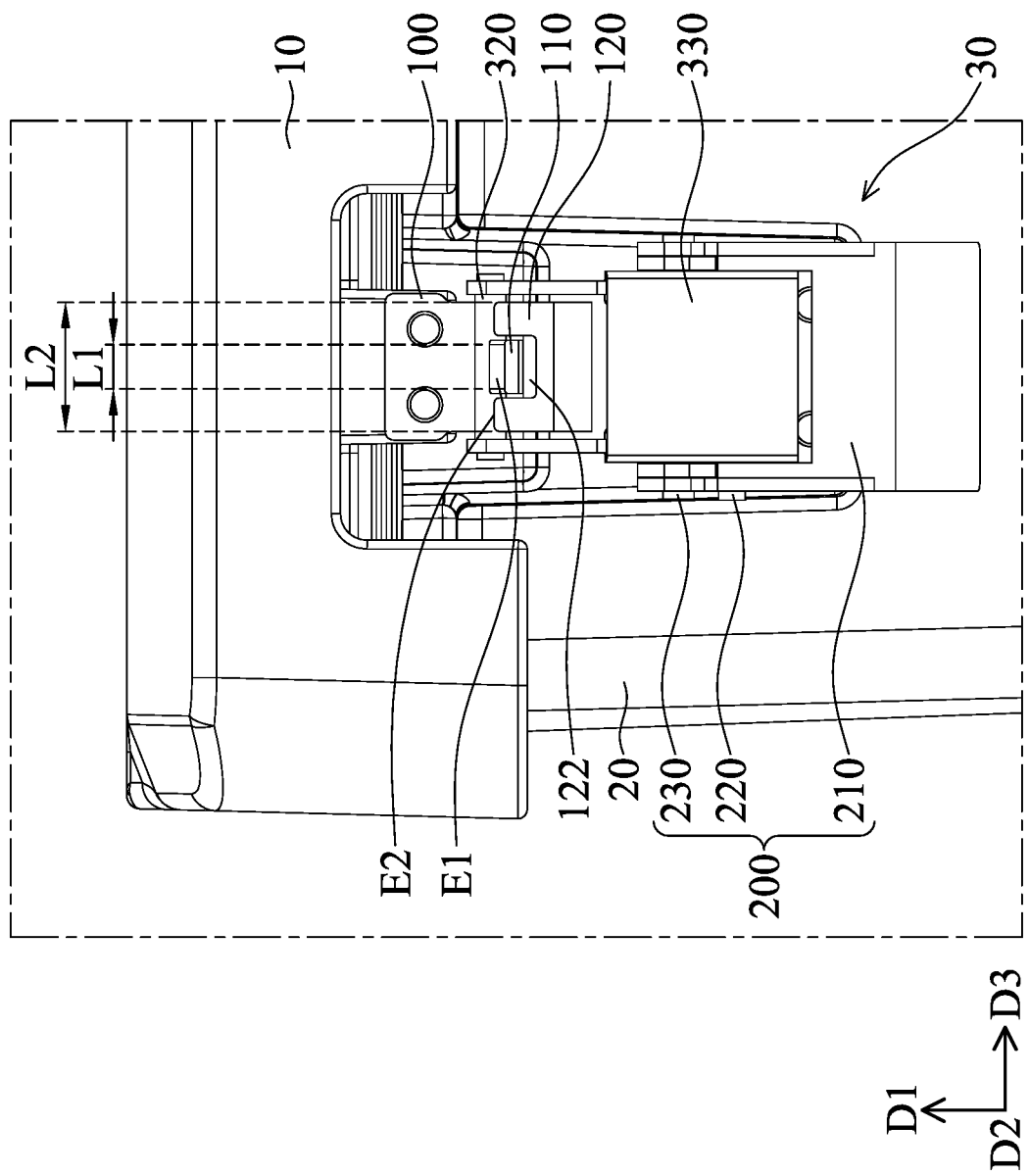
FIG. 3 is a front view of a locking mechanism according to an embodiment of the invention.

FIG. 3 is a front view of the locking mechanism 30 in FIG. 1. Referring to FIG. 1 to FIG. 3, the locking mechanism 30 primarily includes a fixed member 100, a driving member 200, and a movable member 300.

The fixed member 100 is affixed to the first housing 10, and includes a first hook 110 and a second hook 120. The first hook 110 and the second hook 120 can respectively form a first engaging recess 111 and a second engaging recess 121. It should be noted that, the first hook 110 and the second hook 120 are arranged along the arrangement direction of the first housing 10 and the second housing 20 when they are engaged. Thus, since the first housing 10 and the second housing 20 are arranged along a first direction D1 when they are engaged, the first hook 110 and the second hook 120 are arranged along the first direction D1. The first engaging recess 111 and the second engaging recess 121 are therefore arranged along the first direction D1.

The first hook 110 and the second hook 120 are extended downward from the first housing 10, and the second hook 120 is extended further down than the first hook 110. Therefore, in the first direction D1, the first engaging recess 111 is disposed between the first housing 10 and the second engaging recess 121.

In this embodiment, in a second direction D2 that is perpendicular to the first direction D1, the width W2 of the second engaging recess 121 is greater than or equal to the width W1 of the first engaging recess 111. In a third direction D3 that is perpendicular to the first direction D1 and the second direction D2, the length L2 of the second engaging recess 121 is greater than the length L1 of the first engaging recess 111.

As shown in FIG. 2 and FIG. 3, in this embodiment, the end E2 of the second hook 120 can be extended upward to align with or exceed the end E1 of the first hook 110. In other words, in the first direction D1, the distance between the end E2 of the second hook 120 and the bottom B2 of the second engaging recess 121 is greater than the distance between the bottom B1 of the first engaging recess 111 and the bottom B2 of the second engaging recess 121. Furthermore, a depression portion 122 can be formed on the second hook 120, and the end E1 of the first hook 110 can be received in the depression portion 122. Thus, at least a portion of the first hook 110 can be received in the second engaging recess 121.

In this embodiment, the first hook 110 and the second hook 120 are formed by cutting and/or bending the fixed member 100 having a single plate, so that they can be integrally formed as one piece. In some embodiments, the first hook 110 and the second hook 120 can be two separated members, and respectively affixed to the first housing 10.

Referring to FIG. 1 to FIG. 3, the driving member 200 includes an operating member 210, a first hinge 220, and a second hinge 230, and the movable member 300 includes a main body 310, an engaging portion 320, and a case 330. The first hinge 220 passes through the case 330 of the movable member 300 and pivotally connects to the main body 310 and the operating member 210. The first hinge 220 and the second hinge 230 are parallel to each other.

The main body 310 of the movable member 300 is a longitudinal member. One end of the main body 310 is pivotally connected to the first hinge 220, and the other end of the main body 310 is connected to the engaging portion 320. In this embodiment, the engaging portion 320 is a cylinder. The appearance of the engaging portion 320 is not limited, and can be adjusted as required. The case 330 covers the main body 310 to prevent the main body 310 from impact with the external object and causing damage.

Figure 4A:
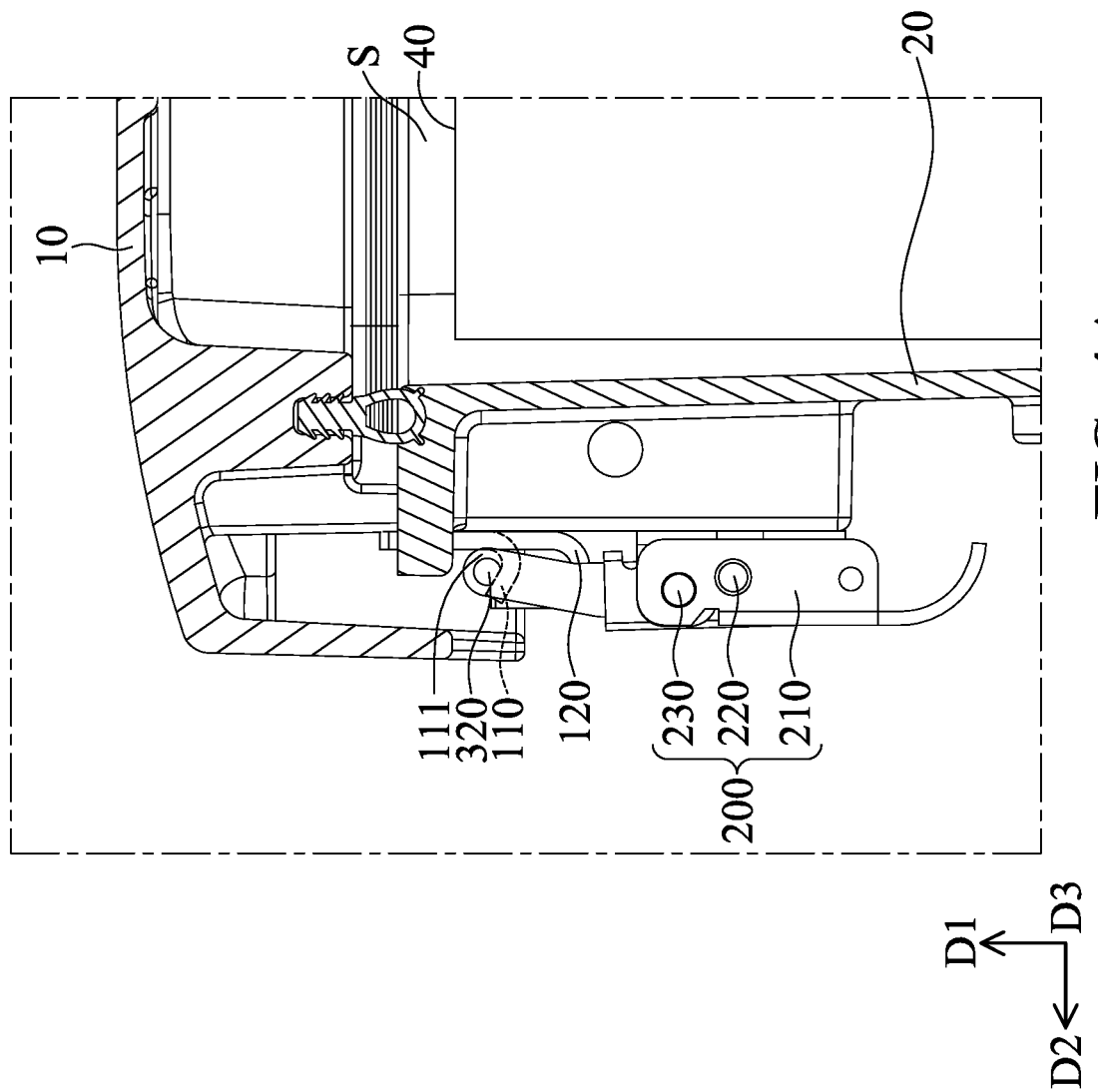
FIG. 4A is a schematic diagram that represents that a first hinge is in a first position according to an embodiment of the invention.

The operating method of the locking mechanism 30 is discussed below. As shown in FIG. 4A, when the first housing 10 is affixed to the second housing 20 through the locking mechanism 30, the engaging portion 320 is accommodated in the first engaging recess 111 and in contact with the first hook 110, the first hinge 220 is in a first position, and the second hinge 230 is disposed between the engaging portion 320 and the first hinge 220.

Figure 4B:
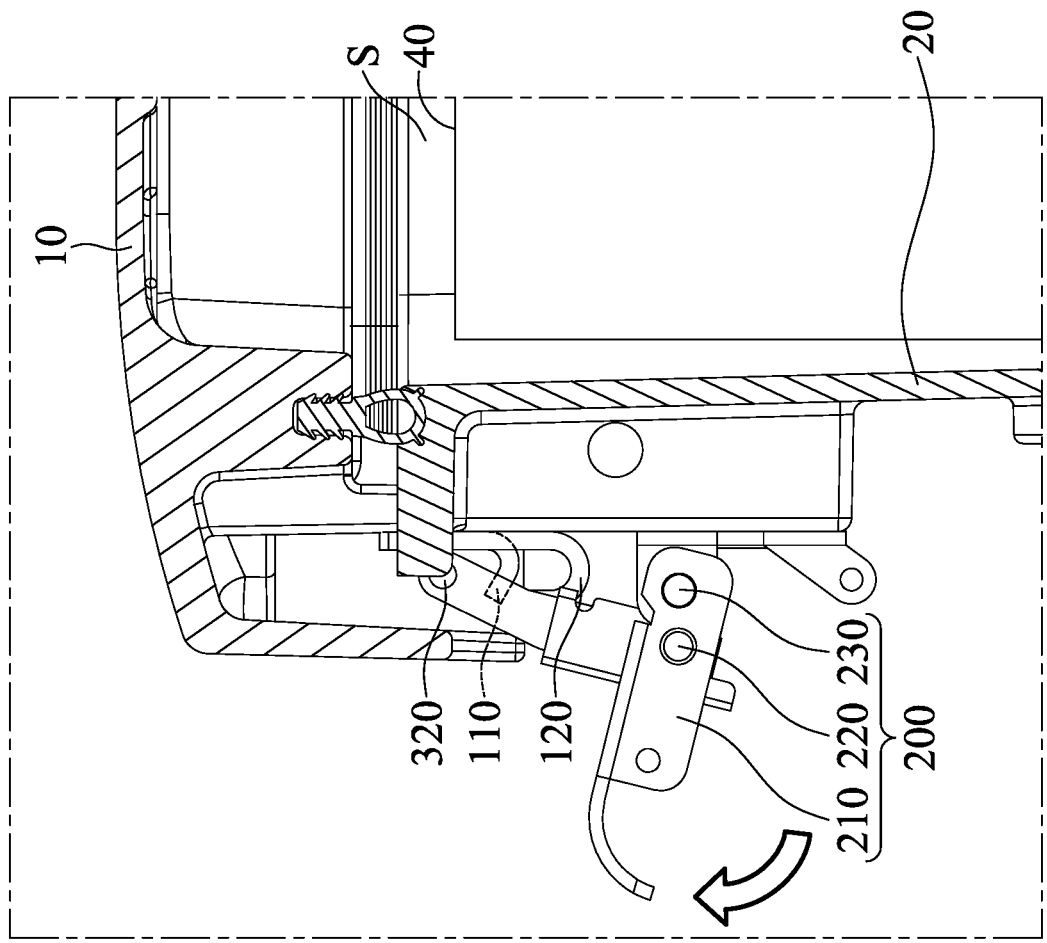
FIG. 4B is a schematic diagram that represents that the first hinge moves from the first position to a second position according to an embodiment of the invention.

As shown in FIG. 4B, when the user wants to separate the first housing 10 from the second housing 20, he or she can pull the operating member 210 to drive the first hinge 220 to move around the second hinge 230 from the first position to the second position. At this time, in the first direction D1, the first hinge 220 is disposed between the engaging portion 320 and the second hinge 230, so that the engaging portion 320 can be released from the first engaging recess 111, and the user can separate the first housing 10 and the second housing 20.

When the user wants to use the locking mechanism 30 to affix the first housing 10 to the second housing 20, he or she can push the operating member 210 reversely after the first housing 10 is connected to the second housing 20, and the first hinge 220 can move around the second hinge 230 from the second position to the first position (FIG. 4A).

Figure 5A:
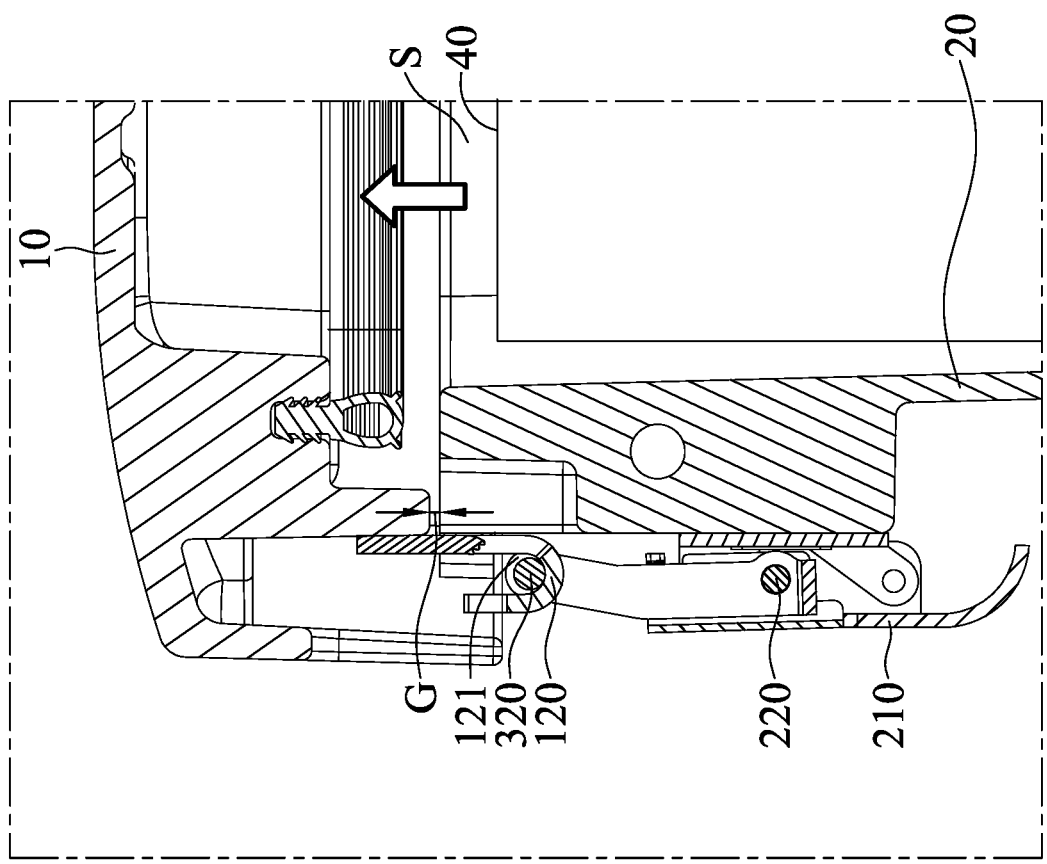
FIG. 5A is a schematic diagram that represents that an engaging portion is accommodated in a second engaging recess when the first hook is broken according to an embodiment of the invention.

As shown in FIG. 5A, when the electronic member 40 (for example, the battery, the transformer, the motor, the internal combustion engine, the printed circuit board, the capacitor, and/or the power component (such as the insulated gate bipolar transistor (IGBT) or the metal-oxide-semiconductor (MOS) transistor)) has a breakdown and explodes, the generated gas may cause the first hook 110 to break. The first housing 10 moves away from the second housing 20 due to the generated gas, so that the engaging portion 320 of the movable member 300 enters the second engaging recess 121 and is in contact with the second hook 120.

Since the width W2 and the length L2 of the second engaging recess 121 are greater than the width W1 and the length L1 of the first engaging recess 111, the second hook 120 can withstand more pressure than the first hook 110. Moreover, when the first hook 110 is broken and the first housing 10 moves due to the gas, the first housing 10 is hooked by the second hook 120 that is in the lower position, so that a gap G can be formed between the first housing 10 and the second housing 20. The gas can be slowly exhausted from the gap G, and the impacting force on the first housing 10 can be gradually decreased. Therefore, it can prevent the first housing 10 from directly departing from the second housing 20.

Since the end E2 of the second hook 120 in this embodiment is extended upward to align with or exceed the end E1 of the first hook 110, and a portion of the first hook 110 is accommodated in the second engaging recess 121, the engaging portion 320 can directly enter the second engaging recess 121 when the first hook 110 is broken. The situation that the engaging portion 320 does not enter the second engaging recess 121 can be prevented.

Figure 5B:
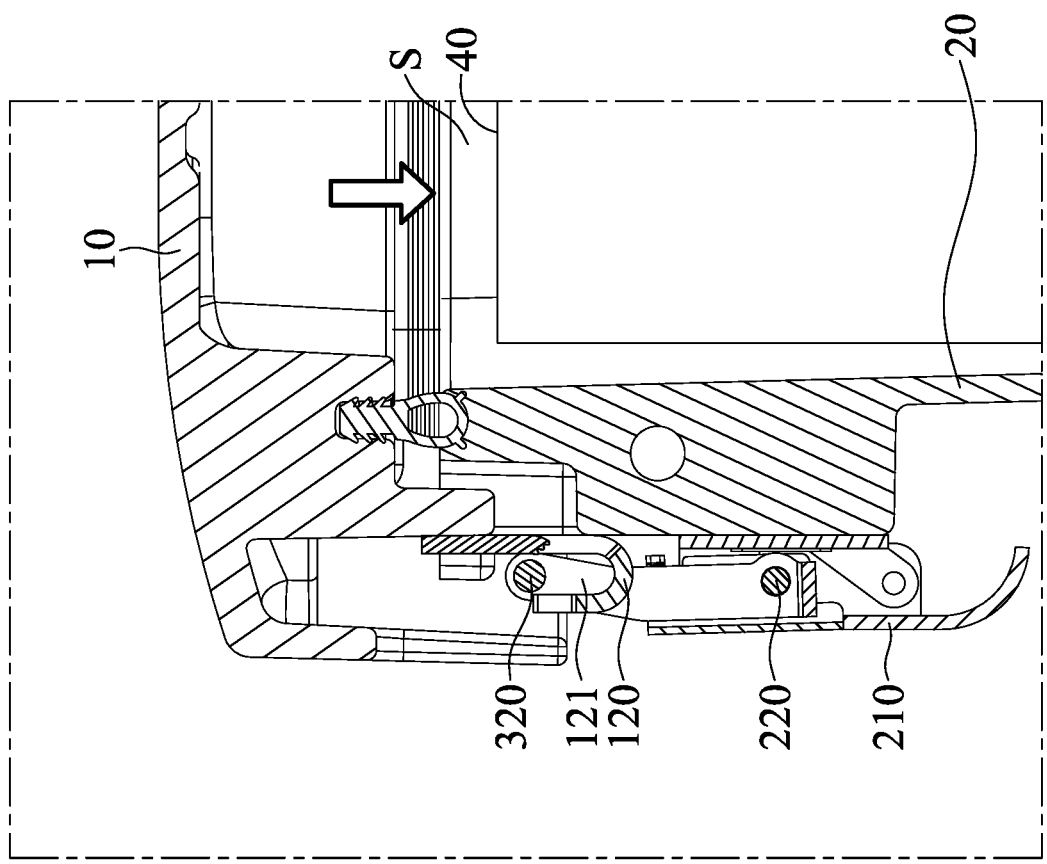
FIG. 5B is a schematic diagram that represents that the first hook is broken and the first housing is engaged to the second housing according to an embodiment of the invention.

Referring to FIG. 5B, when the exhaust process of the aforementioned gas is finished, the first housing 10 can move back to be connected to the second housing 20. It should be noted that, since the end E2 of the second hook 120 in this embodiment is extended upward to align with or exceed the end E1 of the first hook 110, the engaging portion 320 can be still disposed in the second engaging recess 121. The locking mechanism 30 can still restrict the moving range of the first housing 10 in the first direction D1, the second direction D2 and the third direction D3 relative to the second housing 20. Therefore, it can be ensured that the first housing 10 does not depart from the second housing 20 after the first hook 110 is broken.

Moreover, a power switch (not shown) that is electrically connected to the electronic member 40 can be disposed on the first housing 10 or the second housing 20 of the electronic device C. The power switch can be also disposed in a specific position away from the electronic device C and electrically connected to the electronic member 40. When the exhaust of the gas is finished and the user wants to change the electronic member 40, he or she can activate the power switch to cut off the power supply and stop the operation of the electronic member 40, and then open the first housing 10 to change the electronic member 40, so as to avoid the dangers associated with electrical leakage.

In summary, a locking mechanism for connecting a first housing to a second housing is provided, wherein the first housing and the second housing are arranged along a first direction. The locking mechanism includes a first hook, a second hook, a movable member, and a driving member. The first hook and the second hook are affixed to the first housing, and respectively has a first engaging recess and a second engaging recess. The first engaging recess and the second engaging recess are arranged along the first direction. The movable portion has an engaging portion. The driving member is connected to the second housing and the movable member, and is configured to drive the movable member to move relative to the second housing. When the first housing is affixed to the second housing via the locking mechanism, the engaging portion is accommodated in the first engaging recess. Moreover, an electronic device including the aforementioned locking mechanism is also provided Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
   a first housing;
   a second housing, detachably connected to the first housing, wherein the first housing and the second housing are arranged along a first direction; and
   a locking mechanism, comprising:
      a first hook, affixed to the first housing and having a first engaging recess;
      a second hook, affixed to the first housing and having a second engaging recess, wherein the first engaging recess and the second engaging recess are arranged along the first direction;
      a movable member, having an engaging portion; and
      a driving member, connected to the second housing and the movable member, and configured to drive the movable member to move relative to the second housing, wherein when the first housing is affixed to the second housing via the locking mechanism, the engaging portion is accommodated in the first engaging recess, wherein in a second direction that is perpendicular to the first direction, the width of the second engaging recess is greater than the width of the first engaging recess, wherein in a third direction that is perpendicular to the first direction and the second direction, the length of the second engaging recess is greater than the length of the first engaging recess.

2. The electronic device as claimed in claim 1, wherein in the first direction, the first engaging recess is disposed between the first housing and the second engaging recess.

3. The electronic device as claimed in claim 1, wherein in the first direction, the distance between the bottom of the second engaging recess and an end of the second hook is greater than the distance between the bottom of the first engaging recess and the bottom of the second engaging recess.

4. The electronic device as claimed in claim 1, wherein a portion of the first hook is received in the second engaging recess.

5. The electronic device as claimed in claim 1, wherein the first hook and the second hook are integrally formed as one piece.

6. The electronic device as claimed in claim 1, wherein when the first housing is affixed to the second housing via the locking mechanism, the engaging portion is in contact with the first hook.

7. The electronic device as claimed in claim 1, wherein the driving member comprises:
   an operating member;
   a first hinge, pivotally connected to the movable member and the operating member; and
   a second hinge, pivotally connected to the second housing and the operating member.

8. The electronic device as claimed in claim 7, wherein the first hinge is parallel to the second hinge.

9. The electronic device as claimed in claim 7, wherein when the first housing is affixed to the second housing via the locking mechanism, the first hinge is in a first position, and the second hinge is disposed between the engaging portion and the first hinge, wherein when the first hinge moves around the second hinge from the first position to a second position, the first hinge is disposed between the engaging portion and the second hinge.

10. The electronic device as claimed in claim 1, wherein an accommodating space is formed between the first housing and the second housing, and the electronic device further comprises an electronic member accommodated in the accommodating space, wherein the electronic member comprises a printed circuit board, a capacitor, and/or a power component.

* * * * *